United States Patent [19]

Oikawa

[11] Patent Number: 5,299,059
[45] Date of Patent: Mar. 29, 1994

[54] PLURAL-BEAM OPTICAL HEAD INCLUDING A UNIAXIAL CRYSTAL RIGHT TRIANGULAR PRISM BEAM DIVIDER

[75] Inventor: Katsuya Oikawa, Tokyo, Japan

[73] Assignee: Canon Kabushiki Kaisha, Tokyo, Japan

[21] Appl. No.: 873,833

[22] Filed: Apr. 27, 1992

[30] Foreign Application Priority Data

Apr. 30, 1991 [JP] Japan .................................. 3-124552

[51] Int. Cl.$^5$ ...................... G02B 27/10; G02B 27/28; G02B 5/30
[52] U.S. Cl. ..................................... 359/495; 359/496
[58] Field of Search ................................ 359/495, 496

[56] References Cited

U.S. PATENT DOCUMENTS

| | | | |
|---|---|---|---|
| 3,438,692 | 4/1969 | Tabor | 359/495 |
| 3,449,039 | 6/1969 | Hoffman | 359/495 |
| 3,700,308 | 10/1972 | Nicolai | 359/495 |
| 4,634,232 | 1/1987 | Tateoka | 359/495 |
| 5,015,078 | 5/1991 | Oikawa . | |

FOREIGN PATENT DOCUMENTS

| | | | |
|---|---|---|---|
| 25707 | 3/1981 | Japan | 359/496 |
| 122005 | 9/1981 | Japan | 359/495 |
| 198101 | 9/1986 | Japan | 359/496 |
| 471747 | 9/1931 | United Kingdom | 359/495 |

*Primary Examiner*—Jon W. Henry
*Attorney, Agent, or Firm*—Fitzpatrick, Cella, Harper & Scinto

[57] ABSTRACT

In a plural-beam optical head, a linearly polarized light is generated and the linearly polarized light is divided into a plural light beams by the light beam dividing device which is a substantially right triangular prism formed of single-axis crystal. The prism has its inclined surface defined as a total reflection surface and its two sides substantially orthogonal to each other defined as an entrance surface and an exit surface, and is disposed so that the direction of the main axis of the crystal of the prism may form any other angle than 0 degree with respect to all of the direction of the plane normal to the total reflection surface, the direction of the normal to the incidence wave front onto the total reflection surface, the direction of the normal to the reflected wave front from the total reflection surface, the direction of the normal to a plane determined by the normal to the incidence wave front and the normal to the reflected wave front, and the direction of the line of intersection between the plane and the total reflection surface.

9 Claims, 4 Drawing Sheets

PLURAL-BEAM OPTICAL HEAD INCLUDING A UNIAXIAL CRYSTAL RIGHT TRIANGULAR PRISM BEAM DIVIDER

BACKGROUND OF THE INVENTION

1. Field of the Invention

This invention relates to the optical construction of a plural-beam optical head in an optical recording-reproducing apparatus, and particularly to an optical head for dividing a light beam emitted from a light source into a plurality of beams.

2. Related Background Art

Recently, a parallel writing/reading optical head, in which a plurality of light beams are applied in the form of a spot to a recording medium and the recording and reproduction of information are effected on a plurality of information tracks at a time to thereby improve the transfer rate of the information, has been developed as the optical head of an optical recording-reproducing apparatus. The greater the number of light beams, the greater becomes the number of information tracks on which reading or writing is effected at a time and thus, the transfer rate of information is improved. As methods of generating a plurality of light beams, there are broadly two methods, i.e., a method using a light source having a plurality of light emitting sources or a plurality of light sources, and a method of dividing a light beam from a single light emitting source into a plurality of light beams. As an example of the former, there is a method using a combination of a plurality of LDs (semiconductor lasers) and optical elements such as prisms, or a method using an LD array having a plurality of light emitting points. Of these methods, the method using a combination of a plurality of LDs and prisms or the like suffers from the disadvantage that the number of the optical elements used is increased and not only the construction of the optical head becomes complicated, but also the alignment of the light beams emitted from the individual LDs becomes necessary.

Figure 1A:
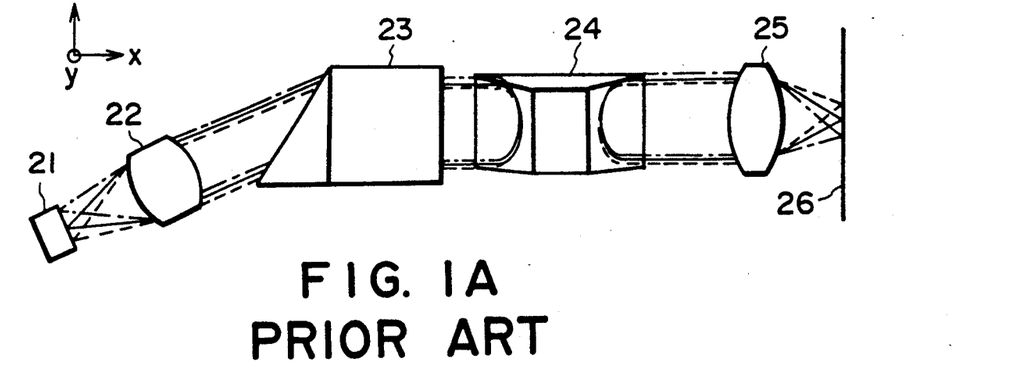
FIGS. 1A to 1C show portions of an optical head optical system according to the prior art.
Figure 1B:
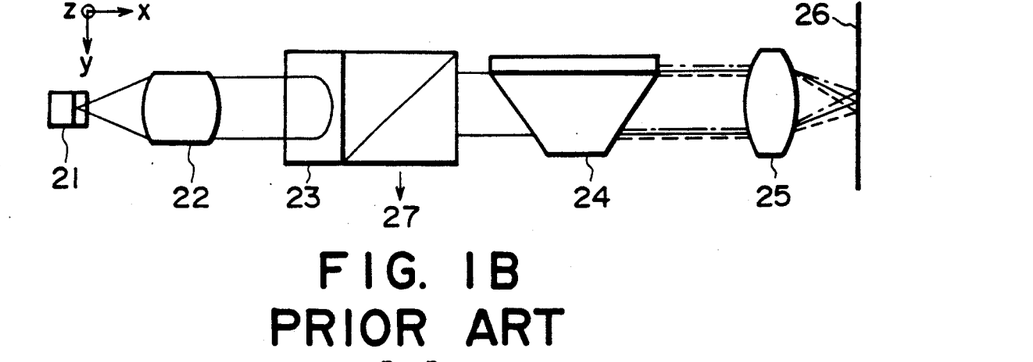
Figure 1C:
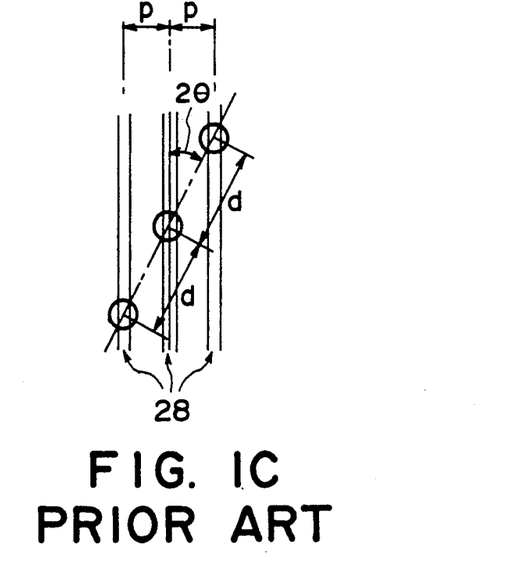

The method using an LD array will hereinafter be described with reference to FIG. 1 of the accompanying drawings. FIGS. 1A and 1B are views in which parts of an optical head optical system according to the prior art are projected onto an xz plane and an xy plane, respectively. The reference numeral 21 designates an LD array having a plurality of light emitting points, the reference numeral 22 denotes a collimator lens, the reference numeral 23 designates a beam splitter serving also as a beam shaping device, the reference numeral 24 denotes an image rotating prism, the reference numeral 25 designates an objective lens, and the reference numeral 26 denotes a recording medium carrying information thereon. FIG. 1C shows a portion of the surface of the recording medium 26. Information tracks 28 are arranged side by side on the recording medium 26.

A divergent light beam emitted from the plurality of light emitting points of the LD array passes through the collimator lens 22, whereby it becomes a plurality of parallel beams conforming to the angle of view with respect to the optical axis of the collimator lens. These parallel beams have their cross-sectional shapes shaped by the beam splitter 23 so as to be substantially circular, whereafter they pass through the image rotating prism 24 and are condensed by the objective lens 25, and form a plurality of spots corresponding to the light emitting points of the LD array on the recording medium 26. The light from these spots is subjected to modulation such as a change in the quantity of reflected light or the rotation of the direction of polarization correspondingly to the information recorded on the information tracks 28, and is made into a parallel beam as a reflected beam via the objective lens 25, whereafter it passes through the image rotating prism 24 and is deflected in the direction of arrow 27 by the beam splitter 23. This deflected light is detected by detecting means, not shown, and the amount of modulation such as the change in the quantity of reflected light or the rotation of the direction of polarization is detected by detecting means, not shown. These detecting means are well known.

When the angle of view of the light emitting points of the LD array with respect to the collimator lens 22 is small, the spacing d between the spots formed on the recording medium 26 is given by the following expression:

$$d \approx (f_o/f_c)(1/K)L,$$

where $f_o$ and $f_c$ are the focal lengths of the objective lens 25 and the collimator lens 22, respectively, L is the spacing between the light emitting points on the LD array 21, and K is the shaping ratio for shaping the elliptical cross-section beam emitted from the LD into a circular cross-section, this shaping ratio being of the order of 1.5–2. Due to various conditions for the optical head, particularly compactness, light weight, the utilization efficiency of the light emitted from the LD, etc., the value of $(f_c/f_o)$ suitable at present is of the order of 2–3. Also, the spacing L between the light emitting points of the LD array 21 is limited to the order of 100 $\mu$m by thermal crosstalk between chips the adjustment accuracy of chip position, etc. Thus, the limit of the inter-spot spacing d on the recording medium 26 is of the order of 20–30 $\mu$m.

On the other hand, it is preferable for the improvement of information recording density that the arrangement pitch P of the information tracks 28 be as small as possible, and for example, in an optical disk, the pitch P is of the order of 1.6 $\mu$m. Therefore, in order to effect the parallel reading-out of adjacent information tracks 28, there is adopted an arrangement as shown in FIG. 1C wherein the direction of arrangement of the light beam spots is inclined by an angle $2\theta$ with respect to the direction in which the information tracks extend. This inclination of the direction of arrangement of the spots is created by the image rotating prism 24. By the image rotating prism 24 being rotated by an angle $\theta$ about a direction x, the inclination by $2\theta$ is created in the direction of arrangement of the spots on the recording medium 26.

The relation between the information track pitch P and the angle of rotation of the image is $$P = d\sin 2\theta \tag{1}$$

and when d = 30 $\mu$m and P = 1.6 $\mu$m, $\theta$ is approximately 1.5°. Also, by the differentiation of the above equation (1), the relation between the irregularity of the angle of rotation $\theta$ of the image rotating prism 24 and the irregularity of the pitch P thereby is $$\Delta P = 2d\cos 2\theta \cdot d\theta. \tag{2}$$

Thus, to effect adjustment with the accuracy of a pitch 0.1 $\mu$m, the accuracy of approximately 6 minutes becomes necessary for the angle of rotation θ of the image, and a great burden is required for assembly adjustment.

Further, for the above-mentioned inter-spot spacing d to be created, an angle of view of approximately 30 minutes is necessary for the objective lens 25. To obtain a high resolution during information reproduction, a lens having NA as high as the order of 0.55 is used as the objective lens 25 and therefore, where said angle of view is as great as 30 minutes, it is difficult in lens designing to require good imaging of all spots, and to secure good imaging, the number of light beams passed through one and the same objective lens is limited to about two.

It is also possible to construct a plural-beam optical head by the use of an LD and beam dividing means utilizing a diffraction grating. As is well known, beam division by a diffraction grating is effected by an angle of diffraction conforming to the order number of diffraction and the angle of diffraction can be selected by the pitch of the diffraction grating and therefore, by making the angle of diffraction, i.e., the angle of division, small, the disadvantage as noted above is eliminated. This method, however, suffers from the following problems. Firstly, the diffraction grating greatly differs in diffraction intensity depending on each order number and is not suitable for the utilization of a plurality of beams equal in quantity of light to one another. Likewise, there is a loss of quantity of light by diffracted lights of the order number than the order number utilized. Secondly, the diffraction grating has its angle of diffraction fluctuated by the wavelength of light used and therefore, when the oscillation wavelength of LD becomes irregular or the fluctuation of the wavelength is caused by the temperature characteristic during operation or the like, the beam division angle is fluctuated.

Figure 2:
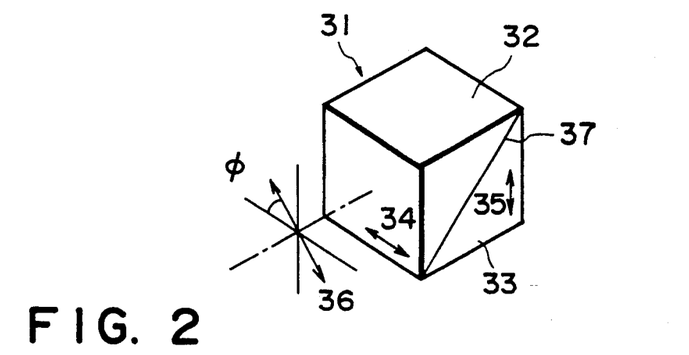
FIG. 2 illustrates light beam division using a Wallaston prism.

Further, the division of a light beam can be accomplished by the use of a Wallaston prism. FIG. 2 of the accompanying drawings is an illustration of that method. A Wallaston prism 31 comprises triangular prisms 32 and 33 of two-axis crystal such as rock crystal cemented together so that the directions of their crystal main axes may be orthogonal to each other. The reference numerals 34 and 35 designate the directions of the crystal main axes of the triangular prism 32 and 33, respectively. The reference numeral 36 denotes the direction of polarization of the incident LD light, and this direction of polarization forms an angle $\phi$ with respect to the direction of the crystal main axis on the entrance surface of the prism. The incident light travels through the triangular prism 32 as ordinary light and extraordinary light whose directions of polarization are orthogonal to each other, and arrives at the boundary surface 37 between the prisms. Since the crystal main axis of the prism 33 is orthogonal to that of the prism 32, the relation between the ordinary light and the extraordinary light is inverted with respect to each polarized component before and after the incident light passes through the boundary surface 37 between the prisms, that is, the polarized component which has sensed an ordinary light refractive index $n_o$ in the prism 32 senses an extraordinary light refractive index $n_e$ in the prism 33, and the polarized component which has sensed the extraordinary light refractive index $n_e$ in the prism 32 senses the ordinary light refractive index $n_o$ in the prism 33 and thus, the two polarized components create refraction at different angles of refraction. Thereby the light beam is divided into two. Where the wavelength of the incident light is 780 nm and rock crystal ($n_o=1.53859$ and $n_e=1.547949$) is used as the prism material, the angle of division is about 1 degree. Also, the ratio of divided quantity of light is expressed as $\sin^2\phi : \cos^2\phi$ by the angle $\phi$ of the direction of polarization of the incident light. Thereby, the divided quantity of light can be determined substantially freely.

However, the Wallaston prism is for the division into two beams, and for the division into more than two beams, a plurality of Wallaston prisms must be combined together, and this leads to complication of the construction of the optical head. Also, since the angle of division is about 1 degree, the angle formed between two beams is of the order of 30 minutes even after beam shaping means having a shaping ratio of the order of 2 is used, and as in the case of the aforedescribed LD array, a great burden is required for the assembly adjustment of the image rotating prism, and to secure good imaging, the number of light beams passed through the one and the same objective lens is limited to the order of two.

On the other hand, the division of a light beam can be accomplished by using, for example, a right triangular prism formed of single-axis crystal and by making the inclined surface of this prism into a total reflection surface and making the other two surfaces into an entrance surface and an exit surface, respectively, and making the direction of the crystal main axis of this prism coincident with the direction of the light beam reflected by the relation surface. Again in this method, however, use is made of only the maximum refractive index and the minimum refractive index obtained from a refractive index elliptical body of single-axis crystal and therefore, the number of beams provided by division is two, and the division into three or more beams is not effected and the angle of division is as great as the order of 1 degree.

SUMMARY OF THE INVENTION

So, in view of the technical background as described above, the present invention has as an object thereof of the provision of a plural-beam optical head which suffers little from the loss of quantity of light and which is stable against the fluctuation of the wavelength of light used and can particularly obtain an angle of division of 30 minutes or less. The present invention also has as an object thereof of the provision of a plural-beam optical head which is suitable for parallel reading-out and in which the imaging characteristic required of an objective lens is relatively gentle and which creates two or more beams.

According to the present invention, as what solves the above-noted problems, there is provided a plural-beam optical head which has light beam dividing means for dividing linearly polarized light into a plurality of light beams and which causes the plurality of light beams from said light beam dividing means to be spot-imaged on a recording medium, characterized in that said light beam dividing means is a substantially right triangular prism formed of single-axis crystal, and said prism has its inclined surface defined as a total reflection surface and has its two sides substantially orthogonal to each other defined as an entrance surface and an exit surface, respectively, and is disposed so that the direction of the crystal main axis of said prism may form any other angle than 0 degree with respect to all of the direction of the plane normal to the total reflection surface, the direction of the normal to the incidence wave front onto the total reflection surface, the direction of the normal to the reflected wave front from the total reflection surface, the direction of the normal to a plane determined by said normal to said incidence wave front and said normal to said reflected wave front, and the direction of the line of intersection between said plane and said total reflection surface.

DETAILED DESCRIPTION OF THE PREFERRED EMBODIMENTS

The present invention provides an optical head in which use is made of dividing means for dividing an incident beam into two or three by the direction of the main axis of the crystal of a triangular prism formed of single-axis crystal being disposed in a predetermined direction and parallel reading-out by two or more spot lights is possible by the use of one and the same optical system. The dividing means uses the double refraction of crystal and therefore, as composed with beam dividing means utilizing a diffraction grating, the fluctuation of the angle of beam division can be reduced for the fluctuation of the wavelength used. Also, as compared with the dividing means using a diffraction grating, the degree of freedom of the choice of the ratio of divided quantity of light is increased and particularly, it becomes easy to set said ratio to equal quantities of light. Next, the above-described dividing means, unlike the conventional Wallaston prism or the like, effects beam division by double refraction using a maximum refractive index $n'$ and a minimum refractive index $n$ determined by a refractive index elliptical body of single-axis crystal and in addition, a refractive index intermediate of these two refractive indices and therefore, division into maximum four beams becomes possible by an element. Further, the use of the refractive index intermediate of the maximum refractive index $n'$ and the minimum refractive index $n$ leads to the possibility of making the angle of division small, as compared with the conventional method using the difference in angle of refraction or angle of reflection based on a maximum refractive index and a minimum refractive index.

Figure 3:
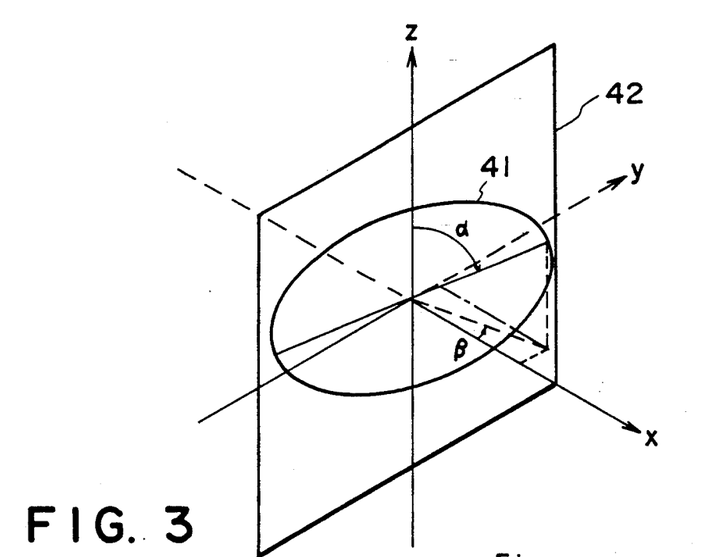
FIG. 3 illustrates the principle of beam division according to the present invention.

The principle of beam division according to the present invention will hereinafter be described with reference to FIG. 3. In FIG. 3, the reference numeral 41 designates a refractive index elliptical body of single-axis crystal, and the lengths of the longest axis and the shortest axis thereof are $n'$ and $n$, respectively ($n < n'$). The reference numeral 42 denotes the reflecting surface of the crystal. The direction cosine of the main axis of the crystal is ($\sin\alpha\cdot\cos\beta$, $\sin\alpha\cdot\sin\beta$, $\cos\alpha$). The direction of the normal of the reflecting surface is x direction, and is chosen so that the direction of the normal to the incidence wave front may be in xy plane. The angle of incidence of the incident light in the crystal onto the reflecting surface 42 (the angle formed between the direction of the normal to the incidence wave front and the direction of the normal to the reflecting surface) is chosen as $\theta''_{in}$, and the angle of reflection of the reflected light in the crystal from said reflecting surface (the angle formed between the direction of the normal to the reflection wave front and the direction of the normal to the reflecting surface) is chosen as $\theta''_{out}$. Generally, in crystal, the incident light comprises ordinary light which senses a refractive index $n$ and extraordinary light which senses a refractive index $n''_{in}$, and the reflected light comprises ordinary light which senses the refractive index $n$ and extraordinary light which senses a refractive index $n''_{out}$.

With it being understood that $\Delta n = n' - n$, $n''_{in}$ is expressed as $$n''_{in} = n\{1 + (\Delta n/n)\cdot[1 - \sin^2\alpha\cdot\sin^2(\beta + \theta''_{in})]\}. \quad (3)$$

If here, the direction of the normal to the incidence wave front and the direction of the main axis of the crystal are chosen so as to differ from each other, $n''_{in} \neq n$. Likewise, with it being understood $\Delta n = n' - n$, $n''_{out}$ is expressed as $$n''_{out} = n\{1 + (\Delta n/n\cdot[1 - \sin^2\alpha\cdot\sin^2(\beta - \theta''_{out})]\}. \quad (4)$$

If here, the direction of the normal to the reflection wave front and the direction of the main axis of the crystal are chosen so as to differ from each other, $n''_{out} \neq n$. Also, when the main axis of the crystal forms any other angle than 0 degree with respect to the direction of the normal to a plane formed by the direction of the normal to the incidence wave front and the direction of the normal to the reflecting surface ($\alpha \neq 0$), if $-\theta''_{in} + \theta''_{out} \neq 2\beta$, $n''_{out} \neq n''_{in}$ can be brought about.

That is, as the changes in a polarized component before and after the reflection on the reflecting surface 42, there are four ways of change: (a) ordinary light→ordinary light, (b) ordinary light→extraordinary light, (c) extraordinary light→ordinary light, and (d) extrordinary light→extraordinary light. The following relations are established with respect to the respective ones of these:

(a) $n\sin\theta''_{in} = n\sin\theta''_{out}$ (5)
(b) $n\sin\theta''_{in} = n''_{out}\sin\theta''_{out}$
(c) $n''_{in}\sin\theta''_{in} = n\sin\theta''_{out}$
(d) $n''_{in}\sin\theta''_{in} = n''_{out}\sin\theta''_{out}$ $\theta''_{in}$, $\theta''_{out}$, $n''_{in}$ and $n''_{out}$ satisfy the above expressions (3), (4) and (5) at a time, but when the main axis of the crystal forms any other angle than degree with respect to the direction of the plane normal to the total reflection surface (that is, $\alpha = 90°$ and $\beta = 0°$ are not brought about a time) and forms any other angle than 0 degree with respect to the direction of the line of intersection between the total reflection surface and the plane formed by the direction of the normal to the incidence wave front and the direction of the normal to the emergence wave front (that is, $\alpha = 90°$ and $\beta = \pm 45°$ are not brought about at a time), the condition that $n''_{out} \neq n''_{in}$ is established before and after reflection and/or the combination and resolution of the polarized waves of the ordinary light and extraordinary light are effected on the reflecting surface during reflection and therefore, at least two of $\theta''_{out}$ given by (a)-(d) in the above-mentioned expression (5) become different from each other and the division of the beam takes out. Here, (a) is equal to the reflection rule in an ordinary uniform medium and gives $\theta''_{in} = \theta''_{out}$. (b) and (d) are in a complicated relation between $n''_{out}$ depends on $\theta''_{out}$, but since $\Delta n$ is small, $\theta''_{out}$ does not differ so much from the case of (a), and by setting the direction of the main axis of the crystal with this point taken into account, it is possible to set the direction of the normal to the reflected wave front and the direction of the main axis of the crystal to a desired angle.

Thus, when $\alpha \neq 0°$ and $\beta \neq 90°$, both of the ordinary light and the extraordinary light are subjected to the rotation of the direction of polarization before and after the reflection on the reflecting surface 42 and therefore the reflection of all of (a)-(d) above takes out. When $-\theta''_{in} + \theta''_{out} = 2\beta$, division into three beams is possible, and in the other base, division into four beams is possible. Also, generally, at least one of $n''_{in}$ and $n''_{out}$ assumes a value mean between n and n' and therefore, in the reflection of (a)-(d) above, a smaller angle of division can be obtained than in a case where only n and n' are utilized. When $\alpha = 90°$ and $\beta \neq 0°$ and $\beta \neq 45°$, the reflection of (a)-(d) above takes place, but by endowing the direction of the main axis of the crystal with a suitable angle with respect to the direction of the normal to the incidence wave front and the direction of the normal to the reflected wave front, $n''_{out} \neq n''_{in}$ is brought about, and $\theta''_{out}$ in the case of (d) differs from that in the case of (a) and division into two beams is possible. At this time, by the setting of $\beta$, the ratio $n''_{in}/n''_{out}$ is made smaller than n'/n or n/n', whereby the angle of division can be made smaller than in the prior art.

Some embodiments of the present invention will hereinafter be described with reference to the drawings.

Figure 4:
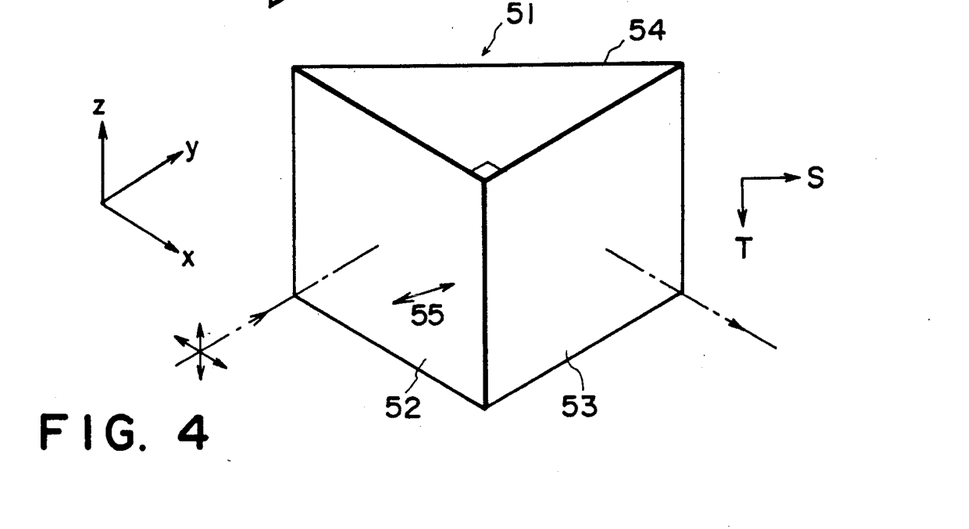
FIG. 4 is a perspective view of beam dividing means used as a constituent member of a first embodiment of a plural-beam optical head according to the present invention.

FIG. 4 shows a perspective view of beam dividing means used as a constituent member of a first embodiment of the plural-beam optical head according to the present invention. In FIG. 4, the reference numeral 51 designates a right isosceles triangular prism formed of rock crystal (single-axis crystal), and a light beam enters a surface 52 parallel to xz plane and emerges from a surface 53 parallel to yz plane. An inclined surface 54 is a total reflection surface. The direction of the main axis of the crystal is indicated by 55, and this direction is in a plane parallel to the surface 52 and forms an angle of 45° with respect to the surface 53. The light beam from an LD entering the prism 51 is linearly polarized light incident on the surface 52 perpendicularly thereto, and has a direction of polarization in the z direction or the x direction orthogonal thereto. Since this light beam is incident on the surface 52 perpendicularly thereto, the direction of the normal to the wave front does not change even after the light beam has entered the crystal. The direction of the normal to the incidence wave front, the direction of the normal to the reflected wave front and the direction of the normal to the reflecting surface 54 form a plane, and the direction 55 of the main axis of the crystal forms an angle of 45° with respect to this plane.

Thus, when the light beam dividing prism 51 of a substantially right triangular shape formed of single-axis crystal has its inclined surface defined as the total reflection surface 54 and has its two sides substantially orthogonal to each other defined as the entrance surface 52 and the exit surface 53, the light beam dividing prism 51 is disposed so that the direction 55 of the main axis of the crystal of the prism may form any other angle than 0 degree with respect to all of the direction of the plane normal to the total reflection surface 54 (direction T), the direction of the normal to the incidence wave front onto the total reflection surface 54 (direction Y), the direction of the normal to the reflected wave front from the total reflection surface 54 (direction x), the direction of the normal to a plane determined by the above-mentioned normal to the incidence wave front and the above-mentioned normal to the reflected wave front (direction z) and the direction of the line of intersection between said plane and the total reflection surface (direction s).

In this first embodiment, the prism 51 is disposed so that the direction 55 of the main axis of the crystal of the prism 51 may not be in a plane formed by the direction of the normal to the incidence wave front onto the total reflection surface 54 and the direction of the normal to the reflected wave front from the total reflection surface and that said plane and the direction of the linearly polarized light to the entrance surface may be parallel or perpendicular to each other.

Since the direction of polarization of the light beam entering the prism 51 forms an angle of 45° with respect to the direction of the main axis of the crystal, this light beam is divided into ordinary light and extraordinary light at a ratio of $\sin 45 : \cos 45 = 1:1$ after it passes through the entrance surface 52 since in this manner, the direction of polarization of the light beam entering the prism 51 forms an angle of 45° with respect to the projection of the main axis of the crystal onto the entrance surface 52, this light beam is divided into ordinary light and extraordinary light at a ratio of 1:1.

Here, in accordance with the expression (3) above, the refractive index of the abnormal light is calculated as $$n''_{in} = n\{1 + (\Delta n/n)\} = n'. \qquad (6)$$

Since $n\sin\theta''_{in}$, $n''_{in}\sin\theta''_{in} \geq 1$, both the ordinary light and the extraordinary light are totally reflected by the reflecting surface 54. Also, the electric field vector on the reflecting surface 54 is the projection of the polarization vectors of the ordinary light and extraordinary light, and an ordinary light component and an extraordinary light component are distributed at a ratio of 1:1 in z direction and a direction perpendicular thereto, respectively.

The direction of the normal to the wave front after reflection is in a plane parallel to xy plane. From the expression (4) above, the refractive index of the extraordinary light after reflection is $$n''_{out} = n\{1 + (\Delta n/n)\cdot[1 - (\tfrac{1}{2})\sin^2(45° - \theta''_{out})]\}. \qquad (7)$$

In the reflection of ordinary light→ordinary light mentioned under item (a) above, $\theta''_{in} = \theta''_{out} = 45°$, and the direction of the normal to the wave front of the reflected beam is x direction. The direction of polarization of the reflected beam is in the y direction and the projection thereof onto the reflecting surface 54 is coincident with the direction of the component on the reflecting surface 54 perpendicular to the z direction and thus half of the electric field of this component effects the reflection of (a). This reflected light beam is incident on the exit surface 53 of the crystal perpendicularly thereto, and there is obtained an emergent beam perpendicular to the exit surface 53.

With regard to the reflection of ordinary light→extraordinary light mentioned under item (b) above, the reflection of abnormal light→normal light mentioned under item (c) above, and the reflection of abnormal light→abnormal light mentioned under item (d) above, $\theta''_{out}$ is determined in accordance with expressions (5), (6) and (7) above. These $\theta''_{out}$ deviate from 45° and therefore, create refraction when the light beam emerges from the exit surface 53. The angle of emergence of the light ray emerging from the exit surface 53 (the angle formed by the light ray with respect to the direction of the plane normal to the exit surface 53) $\theta_{out}$ is found from the angle of reflection $\theta''_{out}$ and the refractive index $n''_{out}$ by the following equation:

$$n''_{out} \sin(\theta''_{out} - 45°) = \sin\theta_{out}$$

Each $\theta_{out}$ when the crystal prism is rock crystal and use is made of LD light of a wavelength λ=780 nm and n=1.53859 and n'=1.547949 is shown in Table 1 below.

TABLE 1

|  | (a) | (b) | (c) | (d) |
|---|---|---|---|---|
| Incident light | ordinary light | ordinary light | Extra-ordinary light | Extra-ordinary light |
| Reflected light | Ordinary light | Extra-ordinary light | Ordinary light | Extra-ordinary light |
| $\theta_{out}$ | 0° | 0.269° | 0.538° | −0.269° |

$\theta''_{out} \approx 45°$ and therefore, the directions of polarization of the ordinary light and extraordinary light of the reflected beam in the crystal are approximately y direction and z direction. Consequently, the magnitudes of the ordinary light and extraordinary light of the reflected beam substantially depend on the magnitudes of the electric field components in z direction and a direction perpendicular to this z direction (the direction of projection onto the reflecting surface in y direction) on the reflecting surface, respectively, but since both of these two components are combined together by the equal contributions of the ordinary light and extraordinary light of the incident beam, the divisions by the reflection mentioned under items (a) to (d) above become substanitally equal in degree. Thus, four divisional light beams of substantially equal intensity are obtained at substantially equal angles of division as shown in Table 1 above.

Figure 5:
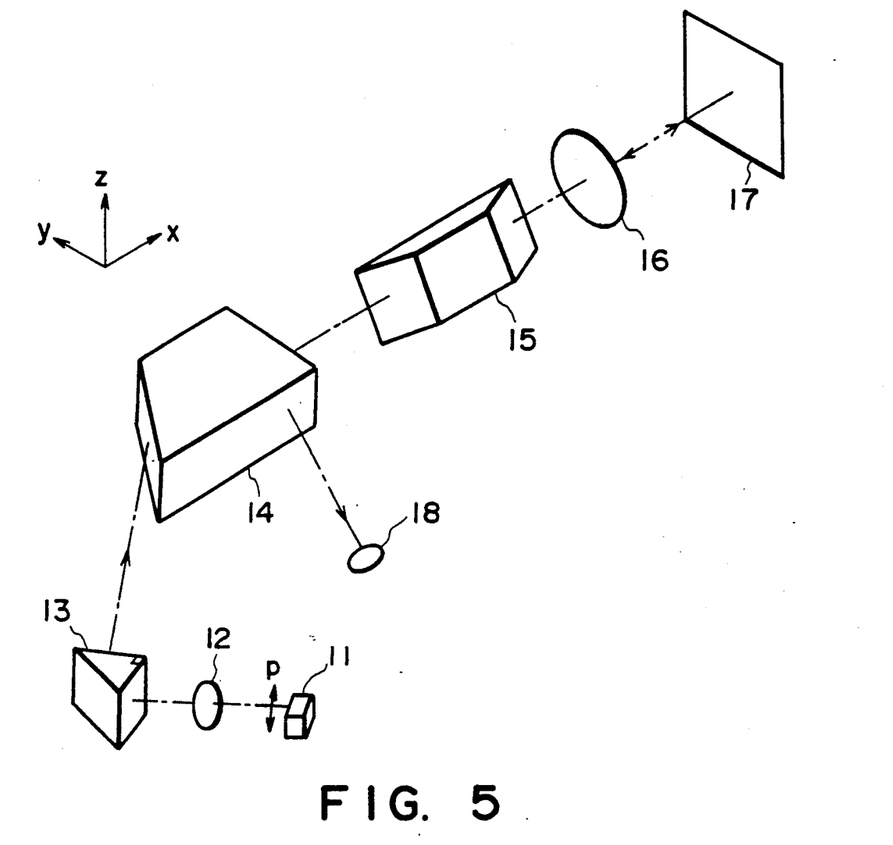
FIG. 5 shows the construction of the first embodiment of the plural-beam optical head according to the present invention.

FIG. 5 shows the construction of an optical head provided with the beam dividing means as described above. In FIG. 5, the reference numeral 11 designates a semiconductor laser (LD), the reference numeral 12 denotes a collimator lens, and the reference numeral 13 designates the beam dividing means (triangular prism) as described above which is formed of rock crystal. The reference numeral 14 denotes a beam splitter serving also as a beam shaping device, the reference numeral 15 designates an image rotating prism, the reference numeral 16 denotes an objective lens, and the reference numeral 17 designates a recording medium. In this recording medium, information tracks extend in the z direction and are juxtaposed in the y direction.

The light beam from the LD 11 is substantially linearly polarized divergent light and is collimated by the collimator lens 12. The disposition of the LD is set so that this beam may have its direction of polarization in p direction (a direction perpendicular to both the z direction and the direction of the optical axis of the collimator lens 12) in FIG. 5. In this case, due to the structure of the LD, usually the cross-section of the beam is an elliptical shape having an aspect ratio of the order of 2, and the major axis thereof is the z direction.

This beam is incident on the entrance surface of the triangular prism 13 perpendicularly thereto. The triangular prism 13 is disposed in the manner as described with reference to FIG. 4. Accordingly, by this prism, the beam is divided into four beams equal in quantity of light and equal in angle of division in the xy plane. One of those divisional beams is on the optical axis of the collimator lens 12. The subsequent optical elements are aligned with said optical axis.

The four emergent beams from the prism 13 enter the beam splitter 14. This beam splitter has two functions, one of which is the junction of deflecting the return light from the recording medium 17 toward detecting means 18 and the other is the function of shaping the light beam from the prism 13. By this beam shaping, the elliptical beam having its major axis in the z direction is enlarged in the y direction and made into a substantially circular beam. At the same time, on the basis of this beam shaping function, the angles of deviation (the angles of division) of the four beams in xy plane are reduced at the same rate. The four beams pass through the image rotating prism 15, whereafter they are condensed by the objective lens 16 and form four spots on the recording medium 17.

These four spots are arranged in a row along the y direction when the image rotating prism 15 is not present or when the bottom surface of the prism is positioned parallel to the xy plane. The spacing d between adjacent ones of the spots is expressed as $d = f_o \tan\theta_{ob}$ by the angle of view $\theta_{ob}$ at which each beam enters the objective lens 16 (this angle corresponds to the angle of division by the triangular prism 13 divided by a beam shaping ratio) and the focal length $f_o$ of the objective lens 16. If use is made of an objective lens having a focal length of 3 mm and a beam splitter 14 having a beam shaping ratio of the order of 2 and the values of Table 1 above are used, d=7.04 μm.

The disposition of the image rotating prism is suitably selected, that is, this prism is rotated about the optical axis, whereby it is possible to rotate the row of spots. The angle of rotation θ for positioning the four spots on the four information tracks, respectively, juxtaposed at a pitch of 1.6 μm is about 6.56° from expression (1) above. Also, the accuracy of the disposition of the image rotating prism required for the adjustment of the accuracy of a track pitch of 0.1 μm is approximately 25.1' from expression (2) above, and thus, as compared with the order of 6' in the prior art, the accuracy can be loosened by about four times. Further, the maximum angle of view at which the four beams enter the objective lens is 16.2' and narrow and therefore, even if the imaging performance of the objective lens is not so much enhanced, it is possible to cause the four beams to be imaged sufficiently well.

In the present embodiment, division into four beams equal in quantity of light is effected for parallel reading-out, but by suitably selecting the angle φ formed between the direction of polarization of the LD light incident on the triangular prism 13 and the main axis of the crystal, it is possible to change the ratio of divisional quantities of light at a ratio of $\cos^2\phi : \sin^2\phi$ with each two beams as a set.

The intensity ratio of distribution to the ordinary light and the extraordinary light after reflection is determined in conformity with the direction of the normal to the reflecting surface, the direction of polarization of the incident light (ordinary light or extraordinary light) and the direction of polarization that can be assumed after reflection (determined by the crystal axis and the direction of the normal to the wave front of the reflected light) and therefore, in some cases, among combinations of these which have substantially equal angles of division, there exist several combinations having different division intensity ratios. At this time, a division intensity ratio approximate to a desired division intensity ratio can be selected, and in the present invention, this can be accomplished by the choice of the direction of the crystal axis.

Figure 6:
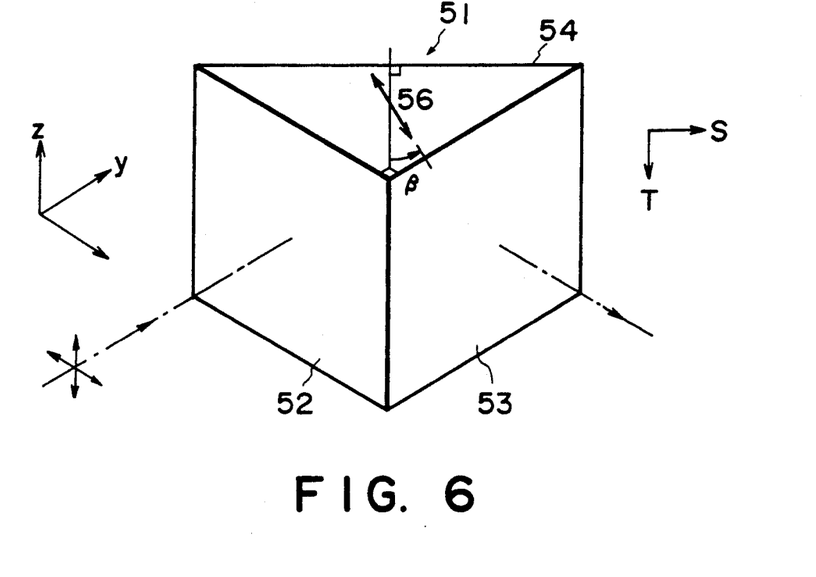
FIG. 6 is a perspective view of beam dividing means used as a constituent member of a second embodiment of the plural-beam optical head according to the present invention.

FIG. 6 shows a perspective view of beam dividing means used as a constituent member of a second embodiment of the plural-beam optical head according to the present invention. In FIG. 6, the reference numeral 51 designates a right isosceles triangular prism formed of rock crystal (single-axis crystal), and a light beam enters a surface 52 parallel to the xz plane and emerges from a surface 53 parallel to the yz plane. An inclined surface 54 is a reflecting surface. The direction of the main axis of the crystal is indicated by 56, and this direction is in a plane perpendicular to all of the entrance surface 52, the exit surface 53 and the reflecting surface 54 and forms as angle $\beta$ with respect to the direction of the normal to the reflecting surface 54.

As described above, the beam dividing means is the substantially right triangular prism 51 formed of a single-axis crystal, and this prism 51 has its inclined surface defined as the total reflection surface 54 and has its two sides substantially orthogonal to each other defined as the entrance surface 52 and the exit surface 53, and is disposed so that the direction 56 of the main axis of the crystal of the prism may form any other angle than 0 degrees with respect to all of the direction of the plane normal to the total reflection surface 54 (T direction), the direction of the normal to the incidence wave front onto the total reflection surface 54 (Y direction), the direction of the normal to the reflected wave front from the total reflection surface 54 (X direction), the direction of the normal to a plane determined by the normal to the incidence wave front and the normal to the reflected wave front (Z direction), and the direction of the line of intersection between said plane and the total reflection surface (S direction).

In this second embodiment, the direction 56 of the main axis of the crystal of the prism is in a plane formed by the direction of the normal to the incidence wave front onto the total reflection surface 54 and the direction of the normal to the reflected wave front from the total reflection surface, and forms any other angle than 0 degree with respect to both of the direction of the line of intersection between said plane and the total reflection surface 54 and the direction of the normal to the total reflection surface.

Also, in this second embodiment, the prism is disposed so that the direction of the main axis of the crystal of the prism may be in a plane formed by the direction of the normal to the incidence wave front onto the total reflection surface and the direction of the normal to the reflected wave front from the total reflection surface and that said plane and the direction of the linearly polarized light to the entrance surface may be parallel or perpendicular to each other.

In this embodiment, as in the first embodiment, linearly polarized light having its direction of polarization in x direction or z direction is caused to enter the entrance surface 52. The planes of polarization of the ordinary light and extraordinary light of the light beam after its entry into the prism face in z direction and x direction, respectively, and after the total reflection by the reflecting surface 54, the plane of polarization of the ordinary light faces in z direction and the plane of polarization of the extraordinary light is in a plane parallel to xy plane. Therefore, the reflection of ordinary light→extraordinary light and the reflection of extraordinary light→ordinary light do not take place and two beams only are obtained by beam division. One of the two beams is by reflection similar to the reflection of ordinary light→ordinary light in a homogeneous medium and emerges from the exit surface 53 perpendicularly thereto. The other beam is by the reflection of extraordinary light→extraordinary light, and in the crystal, from expressions (3), (4) and (5) above, the following relation is established between the angle of incidence $\theta''_{in}$ of the incident beam onto the reflecting surface 54 and the angle of reflection $\theta''_{out}$ of the reflected beam from the reflecting surface 54. Again in the present embodiment, $\theta''_{in} = 45°$ for the same reason as that set forth in the first embodiment.

$$\{1 + (\Delta n/n)[1 - \sin^2(\beta + \theta''_{in})]\}\sin\theta''_{in} = \quad (8)$$
$$\{1 + (\Delta n/n)[1 - \sin^2(\beta - \theta''_{out})]\}\sin\theta''_{out}$$

Also, refraction occurs when the beam emerges from the exit surface 53 and therefore, the angle of emergence (the angle formed with respect to the direction of the normal to the exit surface 53) $\theta_{out}$ of the emergent beam satisfies the following relation $$n\{1+(\Delta n/n)[1-\sin^2(\beta-\theta''_{out})]\}\cdot$$
$$\sin(\theta''_{out}-45°)=\sin\theta_{out} \quad (9)$$

By solving the above two equations (8) and (9) for given $\theta_{out}$, the value of $\beta$ can be set.

Figure 7:
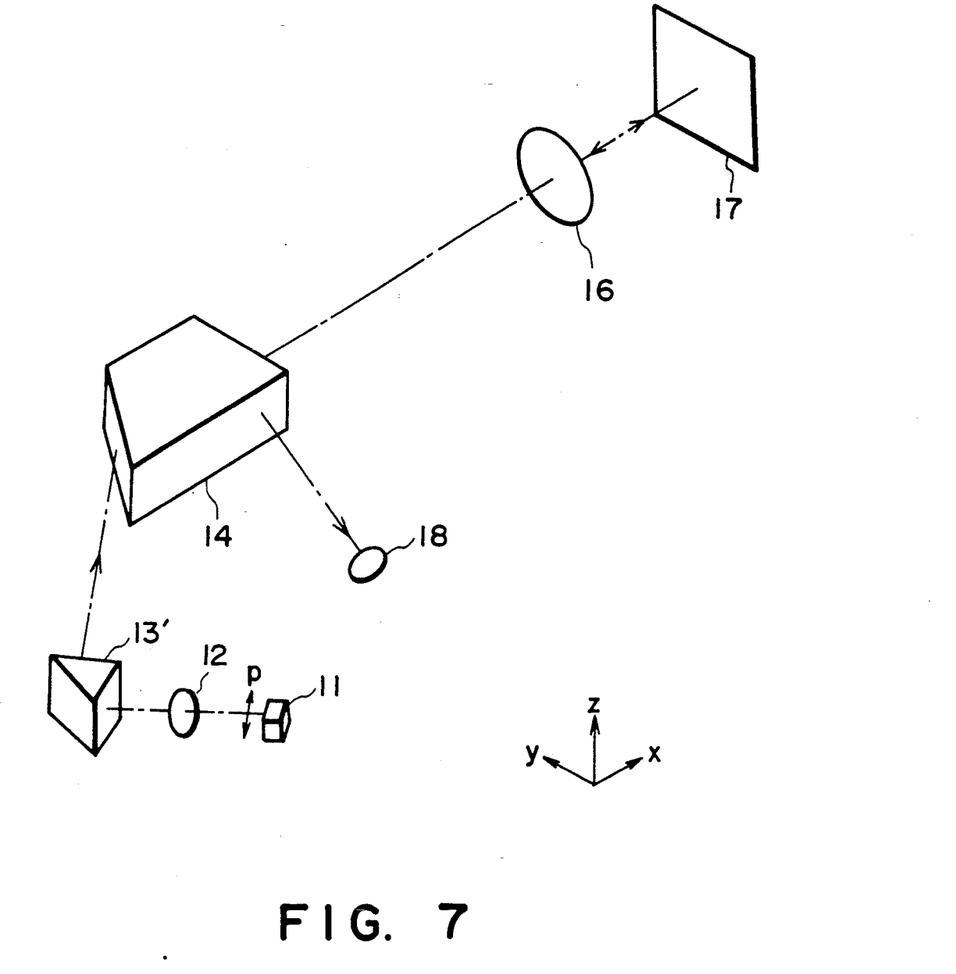
FIG. 7 shows the construction of the second embodiment of the plural-beam optical head according to the present invention.

FIG. 7 shows the construction of an optical head provided with the beam dividing means of FIG. 6 as described above. In FIG. 7, members similar to those in FIG. 5 are given similar reference numerals. Beam dividing means (a triangular prism) 13' is the prism of FIG. 6. In the present embodiment, as compared with the optical head of FIG. 5, the image rotating prism is made unnecessary.

When the LD 11 is caused to emit light under the same conditions as those described in connection with FIG. 5, the light from the LD 11 is divided into two beams by the prism 13', as described in connection with FIG. 6. One of these two beams emerges from the exit surface of the prism 13' perpendicularly thereto, and the other beam emerges while forming an angle of $\theta_{out}$ with respect to the optical axis in xy plane. The angle of opening of these two beams is reduced by the beams passing through the beam splitter 14 serving also as a beam shaping device. The two beams condensed by the objective lens 16 forms two spots on the recording medium 17.

When the spacing between the spots is 1.6 μm and the focal length of the objective lens 16 is 3 mm and the beam shaping ratio is 2, required $\theta_{out}$ is 0.06111°. If $\beta$ is found by the use of the above equations (8) and (9) in order to obtain this value of $\theta_{out}$, $\theta = 3.25°$. The adjustment of the spacing between the spots is possible by rotating the beam splitter 14 about z direction.

The present embodiment has no image rotating prism, and this leads to the advantage that the construction is simplified. Also, in the present embodiment, the direction of arrangement of the spots on the recording medium is perpendicular to the direction in which the information tracks extend. Therefore, in the reproduction of a recording medium on which header portions are uniformly arranged with respect to respective tracks, if use is made of the conventional two spots, it has been necessary to make the timing of signal reading independent for each track or correct the positional deviation because the direction of arrangement of the spots is oblique to the tracks as shown in FIG. 1C, whereas in the present embodiment, if the timing of reading by one spot is taken in accordance with the reading by the other spot, sufficiently good reproduction will be possible and the reproducing circuit will be simplified.

As described above, according to the optical head of the present invention, it becomes possible to use a refractive index between the maximum refractive index and the minimum refractive index of single-axis crystal to effect beam division having a small loss of quantity of light and a small angle of division and division into two, three or four beams at a desired ratio of quantity of light by a simple construction. Thereby, a plurality of spots having a minute spacing therebetween can be formed in accordance with a minute track pitch on a recording medium. Also, even if an image rotating prism is not used, a plurality of spots can be formed on adjacent information tracks, and where the image rotating prism is used, good disposition of spots can be obtained even if the accuracy of the setting of the angle of rotation thereof is loosened. Further, the angle of view for the objective lens can be made small and therefore, even if the characteristic of the angle of view of the objective lens is not made severe, a plurality of divisional beams can be spot-imaged with a good imaging performance by the use of the same objective lens. In addition, the present invention utilizes double refraction and therefore, even if the wavelength of the light used fluctuates, the fluctuation of the angle of division is small.

What is claimed is:

1. A plural-beam optical head comprising:
   a light source for generating linearly polarized light; and
   light beam dividing means for dividing the linearly polarized light from said light source into a plurality of light beams, said light beam dividing means being a substantially right triangular prism formed of a uniaxial crystal, said prism having the hypotenuse side surface thereof as a total reflection surface and having its two side surfaces, which are substantially orthogonal to each other, as an entrance surface and an exit surface, respectively, said prism being disposed so that the direction of the principal axis of the crystal forms an angle other than 0 degrees with respect to all directions which are:
   i) normal to the total reflection surface;
   ii) normal to an incidence wave surface incident on the total reflection surface;
   iii) normal to a reflection wave surface reflected from said total reflection surface;
   iv) normal to a plane defined by the normal to the incident wave surface and the normal to the reflection wave surface; and which
   v) intersect said plane and said total reflection surface.

2. A plural-beam optical head according to claim 1, wherein the direction of the principal axis of the crystal of said prism is not in a plane formed by the direction of the normal to the incident wave surface onto the total reflection surface and the direction of the normal to the reflection wave surface from the total reflection surface.

3. A plural-beam optical head according to claim 1, wherein the direction of the principal axis of the crystal of said prism is in a plane formed by the direction of the normal to the incident wave surface onto the total reflection surface and the direction of the normal to the reflection wave surface from the total reflection surface, and forms any other angle than 0 degrees with respect to both of the direction of the line of intersection between said plane and the total reflection surface and the direction of the normal to the total reflection surface.

4. An optical device comprising:
   a light source for generating linearly polarized light; and
   light beam dividing means for dividing the linearly polarized light from said light source into a plurality of light beams, said light beam dividing means being a substantially right triangular prism formed of a uniaxial crystal, said prism having the hypotenuse side surface thereof as a total reflection surface and its two side surfaces, which are substantially orthogonal to each other as an entrance surface and an exit surface, respectively, said prism being disposed so that the direction of the principal axis of the crystal forms an angle other than 0 degrees with respect to all directions which are:
   i) normal to said total reflection surface,
   ii) normal to an incidence wave surface incident on said total reflection surface,
   iii) normal to a reflection wave surface reflected by said total reflection surface,
   iv) normal to a plane defined by the normal to the incident wave surface and the normal of the reflection wave surface, and which
   v) intersect the plane and the total reflection surface.

5. An optical device according to claim 4, wherein the direction of the principal axis of the crystal of said prism is not in a plane formed by a direction normal to the incident wave surface incident on the total reflection surface and a direction normal to the reflection wave surface reflected from the total reflection surface.

6. An optical device according to claim 4, wherein the direction of the principal axis of the crystal of said prism is in the plane formed by a direction normal to the incident wave surface incident on the total reflection surface and a direction normal to the reflection wave surface reflected from the total reflection surface, and forms any angle other than 0 degrees with respect to both a line of intersection between said plane and said total reflection surface and a direction normal to said total reflection surface.

7. A light beam dividing device for dividing linearly polarized light into a plurality of light beams, said light beam dividing device comprising:
- a substantially right triangular prism formed of a uniaxial crystal, said prism having the hypotenuse side surface thereof as a total reflection surface and its two side surfaces, which are substantially orthogonal to each other, as an entrance surface and an exit surface, respectively, said prism being disposed so that the direction of the principal axis of the crystal forms an angle other than 0 degrees with respect to all directions which are:
  - i) normal to said total reflection surface,
  - ii) normal to an incidence wave surface incident on said total reflection surface,
  - iii) normal to a reflection wave surface reflected from said total reflection surface,
  - iv) normal to a plane defined by the normal to the incident wave surface and the normal of the reflection wave surface, and which
  - v) intersect said plane and said total reflection surface.

8. A light beam dividing device according to claim 7, wherein the direction of the principal axis of the crystal of said prism is not in a plane formed by a direction normal to the incident wave surface incident on the total reflection surface and a direction normal to the reflection wave surface reflected from the total reflection surface.

9. A light beam dividing device according to claim 7, wherein the direction of the principal axis of the crystal of said prism is in a plane formed by a direction normal to the incident wave surface incident on the total reflection surface and a direction normal to the reflection wave surface reflected from the total reflection surface, and forms any angle other than 0 degrees with respect to both a line of intersection between said plane and said total reflection surface and a direction normal to said total reflection surface.

* * * * *

UNITED STATES PATENT AND TRADEMARK OFFICE
CERTIFICATE OF CORRECTION

PATENT NO. : 5,299,059

DATED : March 29, 1994

INVENTOR(S) : Katsuya Oikawa

It is certified that error appears in the above-indentified patent and that said Letters Patent is hereby corrected as shown below:

COVER PAGE
At [56] "471747 9/1931 Untied Kingdom" should read --471747 9/1937 United Kingdom--.

COLUMN 2
Line 20, "$d \cong (fo/fc)1/K)L,$" should read --$d \cong (fo/fc)(1/K)L,$--.
Line 62, "rotation 0" should read --rotation $\theta$--.

COLUMN 4
Line 67, "incidence" should read --incident--.

COLUMN 5
Line 3, "incidence" should read --incident--.

COLUMN 6
Line 6, "incidence" should read --incident--.
Line 9, "incidence" should read --incident--.
Line 27, "incidence" should read --incident--.
Line 41, "incidence" should read --incident--.
Line 60, "than" should read --than 0--.
Line 66, "incidence" should read --incident--.

COLUMN 7
Line 10, "$\theta"_{in}=\theta"_{out.}$" should read --$\theta"_{in}=\theta"_{out,}$--.
Line 61, "incidence" should read --incident--.

COLUMN 8
Line 9, "incidence" should read --incident--.
Line 14, "incidence" should read --incident--.
Line 22, "incidence" should read --incident--.

UNITED STATES PATENT AND TRADEMARK OFFICE
CERTIFICATE OF CORRECTION

PATENT NO. : 5,299,059
DATED : March 29, 1994
INVENTOR(S) : Katsuya Oikawa

It is certified that error appears in the above-indentified patent and that said Letters Patent is hereby corrected as shown below:

COLUMN 11
    Line 45, "incidence" should read --incident--.
    Line 50, "incidence" should read --incident--.
    Line 56, "incidence" should read --incident--.
    Line 67, "incidence" should read --incident--.

COLUMN 12
    Line 40, "relation" should read --relation:--.

COLUMN 14
    Line 1, "incidence" should read --incident--.
    Line 44, "incidence" should read --incident--.
    Line 48, "to" (second occurrence) should read --of--.

COLUMN 15
    Line 14, "incidence" should read --incident--.
    Line 18, "to" (second occurrence) should read --of--.

Signed and Sealed this

Eleventh Day of October, 1994

Attest:

BRUCE LEHMAN

*Attesting Officer*      *Commissioner of Patents and Trademarks*